US012313950B2

(12) United States Patent
Lee et al.

(10) Patent No.: US 12,313,950 B2
(45) Date of Patent: *May 27, 2025

(54) LIGHT ROUTE CONTROL MEMBER AND DISPLAY HAVING THE SAME

(71) Applicant: LG INNOTEK CO., LTD., Seoul (KR)

(72) Inventors: Jong Sik Lee, Seoul (KR); Byung Sook Kim, Seoul (KR); Jin Gyeong Park, Seoul (KR); In Hae Lee, Seoul (KR); Young Ju Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/754,681

(22) PCT Filed: Sep. 21, 2020

(86) PCT No.: PCT/KR2020/012732
§ 371 (c)(1),
(2) Date: Apr. 8, 2022

(87) PCT Pub. No.: WO2021/071133
PCT Pub. Date: Apr. 15, 2021

(65) Prior Publication Data
US 2024/0094591 A1   Mar. 21, 2024

(30) Foreign Application Priority Data

Oct. 8, 2019   (KR) .................. 10-2019-0124613
Oct. 10, 2019  (KR) .................. 10-2019-0125412
Oct. 11, 2019  (KR) .................. 10-2019-0125954

(51) Int. Cl.
*G02F 1/167*   (2019.01)
*G02F 1/1335*  (2006.01)
(Continued)

(52) U.S. Cl.
CPC ............ *G02F 1/167* (2013.01); *G02F 1/1335* (2013.01); *G02F 1/16757* (2019.01);
(Continued)

(58) Field of Classification Search
CPC ................. G02F 1/167; G02F 1/16757; G02F 2001/1678; G02F 1/1681; G02F 1/1677; G02F 2201/44
See application file for complete search history.

(56) References Cited

U.S. PATENT DOCUMENTS 6,894,825 B2   5/2005   Takeda
7,342,556 B2   3/2008   Oue et al.
(Continued)

FOREIGN PATENT DOCUMENTS

CN   1504821 A      6/2004
CN   101782707 A    7/2010
(Continued)

OTHER PUBLICATIONS

International Search Report dated Jan. 8, 2021 in International Application No. PCT/KR2020/012732.
(Continued)

*Primary Examiner* — Paisley L Wilson
(74) *Attorney, Agent, or Firm* — Saliwanchik, Lloyd & Eisenschenk

(57) ABSTRACT

An optical path control member according to an embodiment comprises: a first substrate; a first electrode provided on the upper portion of the first substrate; a second substrate provided on the first substrate; a second electrode provided on the lower portion of the second substrate; and an optical conversion unit provided between the first electrode and the second electrode, wherein the optical conversion unit comprises partition wall parts and accommodation parts which are alternately arranged. The accommodation parts have a
(Continued)

light transmission rate that varies according to the application of a voltage, and the accommodation parts comprise a plurality of unit accommodation cells spaced apart from each other, and comprises a dispersion and light-absorbing particles which are dispersed in the dispersion. The light-absorbing particles comprise first particles and second particles, wherein the diameter of the first particles is greater than that of the second particles, and the surfaces of the first particles and the surfaces of the second particles are charged with the same polarity.

17 Claims, 14 Drawing Sheets

(51) Int. Cl.
  *G02F 1/16757* (2019.01)
  *G02F 1/1677* (2019.01)
  *G02F 1/1681* (2019.01)
  G02F 1/1675 (2019.01)

(52) U.S. Cl.
  CPC .......... *G02F 1/1677* (2019.01); *G02F 1/1681* (2019.01); G02F 2001/1678 (2013.01); G02F 2201/44 (2013.01)

(56) References Cited

U.S. PATENT DOCUMENTS

| | | | |
|---|---|---|---|
| 7,751,115 | B2 | 7/2010 | Song |
| 10,656,493 | B2 | 5/2020 | Heikenfeld et al. |
| 10,852,615 | B2 | 12/2020 | Koch et al. |
| 11,773,647 | B2 | 10/2023 | Koch et al. |
| 11,783,790 | B2 | 10/2023 | Wang et al. |
| 2004/0145696 | A1 | 7/2004 | Oue et al. |
| 2004/0190113 | A1 | 9/2004 | Hiraoka et al. |
| 2006/0202949 | A1 | 9/2006 | Danner et al. |
| 2013/0222884 | A1 | 8/2013 | Moriyama et al. |
| 2016/0139479 | A1* | 5/2016 | Hirai ...................... G02F 1/167 359/296 |
| 2018/0031942 | A1 | 2/2018 | Koch et al. |
| 2018/0046055 | A1 | 2/2018 | Heikenfeld et al. |
| 2019/0179208 | A1 | 6/2019 | Sato et al. |
| 2021/0108463 | A1 | 4/2021 | Koch et al. |
| 2023/0121668 | A1 | 4/2023 | Wang et al. |
| 2023/0417102 | A1 | 12/2023 | Koch et al. |

FOREIGN PATENT DOCUMENTS

| | | | |
|---|---|---|---|
| CN | 109991791 A | | 7/2019 |
| CN | 110520791 A | | 11/2019 |
| JP | 2008-19493 A | | 1/2008 |
| JP | 2008-107484 A | | 5/2008 |
| JP | 2016-62091 A | | 4/2016 |
| KR | 10-2005-0067188 A | | 6/2005 |
| KR | 10-2007-0041648 A | | 4/2007 |
| KR | 10-2012-0034999 A | | 4/2012 |
| KR | 2012-034999 | * | 4/2012 |
| KR | 10-2013-0046085 A | | 5/2013 |
| KR | 10-2013-0078440 A | | 7/2013 |
| KR | 10-2013-0098197 A | | 9/2013 |
| KR | 10-2014-0003775 A | | 1/2014 |
| KR | 10-2015-0126515 A | | 11/2015 |
| WO | 2012/047000 A2 | | 4/2012 |
| WO | 2016/089974 A1 | | 6/2016 |

OTHER PUBLICATIONS

Office Action dated Jun. 10, 2024 in Korean Application No. 10-2019-0124613.
Office Action dated Jun. 17, 2024 in Korean Application No. 10-2019-0125412.
Office Action dated Mar. 21, 2025 in Chinese Application No. 202080070831.X.

* cited by examiner

Fig. 15
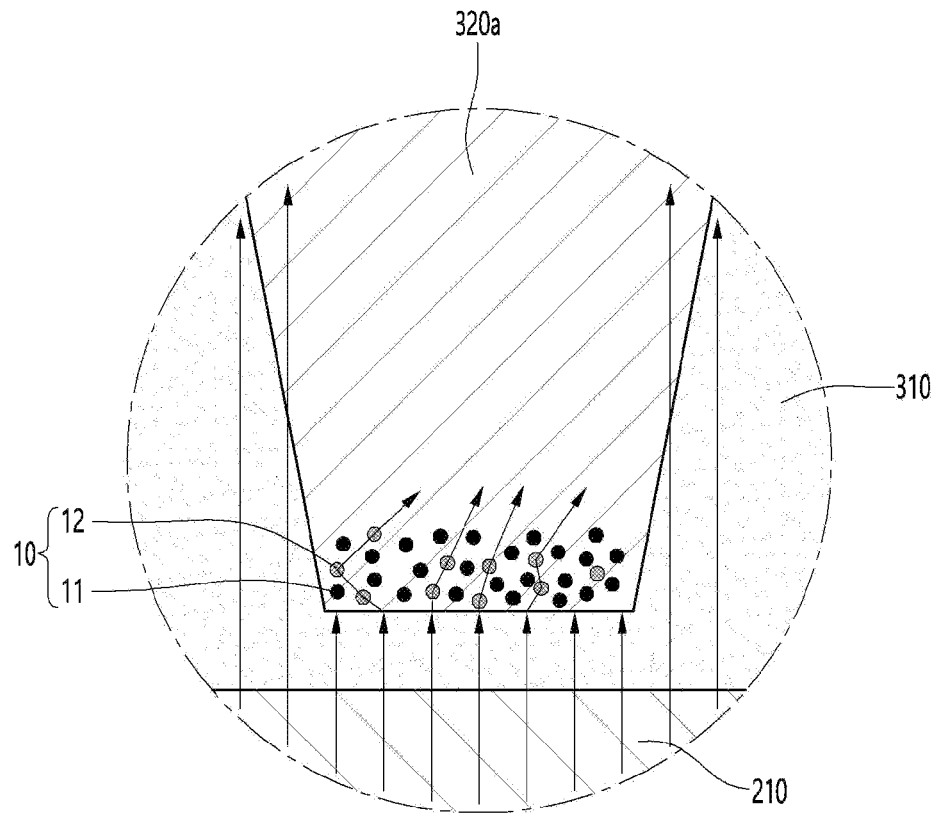
Fig. 16
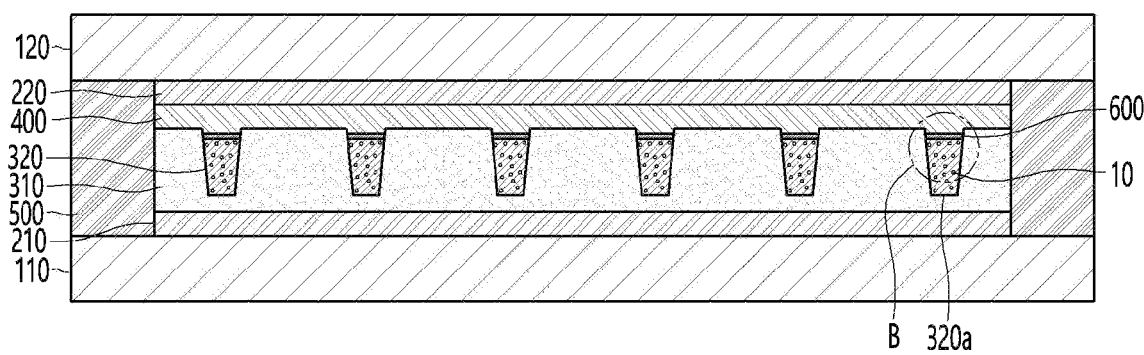

Fig. 20
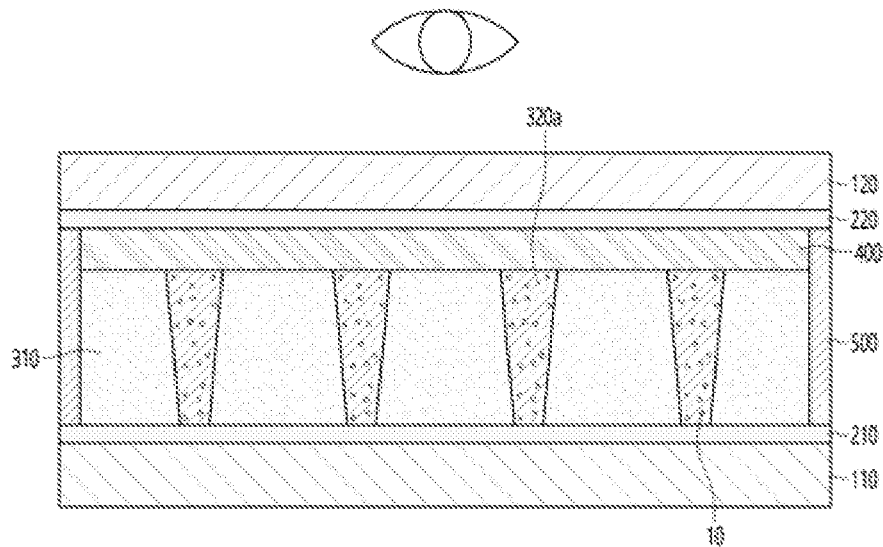
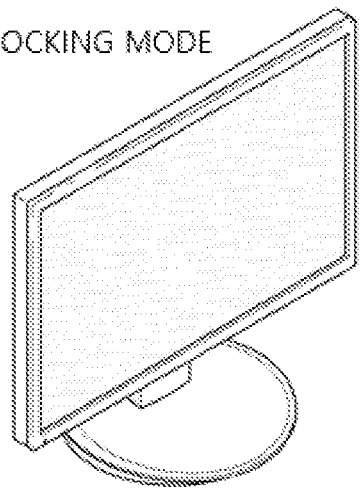
LIGHT BLOCKING MODE

Fig. 21
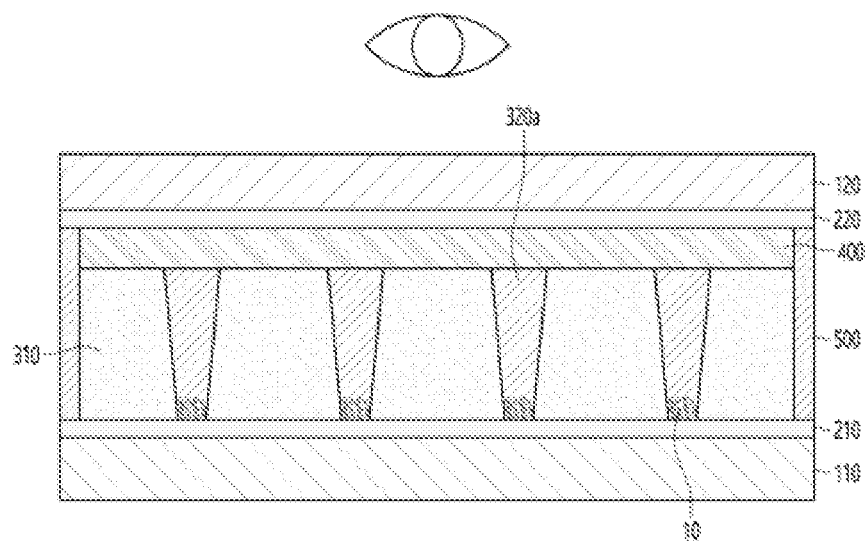
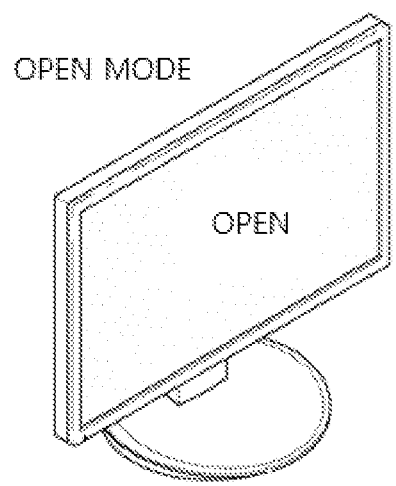
OPEN MODE

LIGHT ROUTE CONTROL MEMBER AND DISPLAY HAVING THE SAME

CROSS-REFERENCE TO RELATED APPLICATIONS

This application is the U.S. national stage application of International Patent Application No. PCT/KR2020/012732, filed Sep. 21, 2020, which claims the benefit under 35 U.S.C. § 119 of Korean Application Nos. 10-2019-0124613, filed Oct. 8, 2019; 10-2019-0125412, filed Oct. 10, 2019; and 10-2019-0125954, filed Oct. 11, 2019; the disclosures of each of which are incorporated herein by reference in their entirety.

TECHNICAL FIELD

An embodiment relates to a light route control member and display having the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may be a light route control member that controls a movement path of light, block light in a specific direction, and transmit light in a specific direction. Accordingly, by controlling the light transmission angle by the light-shielding film, it is possible to control the viewing angle of the user.

Meanwhile, such a light-shielding film may be a light-shielding film that can always control the viewing angle regardless of the surrounding environment or the user's environment, and switchable light-shielding film that allows the user to turn on/off the viewing angle control according to the surrounding environment or the user's environment may be distinguished.

Such a switchable light-shielding film may be implemented by adding electrically moving particles to the pattern part and changing the pattern part into a light transmitting part and a light blocking part by dispersion and aggregation of the particles.

On the other hand, the light-shielding effect according to the particles can be improved as the number of particles increases, but when the number of particles in a limited space is increased, aggregation occurs between the particles, and the movement speed of the particles is reduced by the aggregation of these particles and the viewing angle control effect may be reduced.

Accordingly, there is a need for a light route control member having a new structure capable of implementing an improved light blocking effect while adding the same number of particles.

DISCLOSURE

Technical Problem

An embodiment is to provide a light route control member capable of inhibiting aggregation of electrophoretic particles while implementing an improved light blocking effect according to electrophoretic particles, and a display device including the same.

Technical Solution

A light route control member according to embodiment includes a first substrate, a first electrode disposed on an upper surface of the first substrate, a second substrate disposed on the first substrate, a second electrode disposed on a lower surface of the second substrate, and a light conversion part disposed between the first electrode and the second electrode, and the light conversion part includes a partition wall part and a receiving part that are alternately disposed, and the receiving part includes a plurality of unit receiving cells spaced apart from each other, and the receiving part includes a dispersion and a plurality of light absorbing particles dispersed in the dispersion, and the light absorbing particles include a first particle and a second particle, and a particle diameter of the first particle is larger than a particle diameter of the second particle, and a surface of the first particle and a surface of the second particle are charged with the same polarity.

Advantageous Effects

A light route control member and the display device including the same according to the embodiment may include electrophoretic particles having different particle diameters.

That is, in the case of the light absorbing particles including the first particles and the second particles having different particle diameters, they have an improved packing density compared to the light absorbing particles having the same particle diameter. Thereby, it can be disposed to be aggregated to a low height inside the receiving part.

Accordingly, it is possible to decrease the aggregation height of the light absorbing particles, thereby increasing the light transmitting area of the receiving part in the light route control member driven in the transmissive mode by applying a voltage. Accordingly, by increasing the light transmission area in the transmission mode, the front luminance can be improved, thereby improving the visibility of the user.

In addition, the light route control member according to the embodiment may have an improved front transmittance.

Also, the light route control member according to the embodiment may have improved luminance uniformity.

In detail, the transmittance of the light conversion part may be improved when the light conversion part is driven to the transmitting part by the metal oxide particles that reflect and/or scatter light to the light conversion particles disposed in the light conversion part.

That is, by disposing the light scattering particles in a region where the light absorbing particles are disposed, the amount of light emitted in the user direction through the light scattering particles is increased, thereby improving the front transmittance.

In addition, it is possible to inhibit a portion in which the amount of light is reduced from being visually recognized by the light conversion part region. That is, the overall luminance uniformity of the light route control member may be ensured, and thus the visibility of the user may be improved.

In addition, in the light route control member according to the embodiment, the specific gravity of the sealing material may be greater than the specific gravity of the dispersion.

That is, the sealing material can be cured by disposing the sealing material on top of the dispersion, allowing the dispersion to penetrate into a predetermined area inside the receiving part, and then inverting the substrates up and down. Thereby, the sealing layer which seals the dispersion can be formed in the inside of a receiving part.

Accordingly, it is possible to solve the material limitation according to the specific gravity of the sealing material and the dispersion, thereby improving the sealing properties of the dispersion through a sealing material having a high specific gravity but high sealing properties. In addition, by using a dispersion having a high specific gravity but having a high dielectric constant and a low viscosity, the movement speed of the light absorbing particles dispersed in the dispersion can be improved.

In addition, since the specific gravity of the sealing material is greater than the specific gravity of the dispersion, the dispersion may be disposed by moving upward from the inside of the receiving part, and the sealing material may be disposed by moving from the inside of the receiving part to the bottom.

Accordingly, it is possible to inhibit the dispersion from overflowing in the direction of the partition wall part under the receiving part, thereby inhibiting the partition wall part from being contaminated by the dispersion.

That is, by making the specific gravity of the sealing material larger than the specific gravity of the dispersion, it is possible to inhibit the dispersion from overflowing to the outside.

Accordingly, the light route control member according to the embodiment may have improved driving characteristics and reliability.

DESCRIPTION OF DRAWINGS

FIGS. 13 to 15 are views showing another enlarged view of area A of FIG. 5.

FIGS. 16 and 17 are views showing a cross-sectional view of a light route control member according to another embodiment.

FIGS. 20 and 21 are views for describing one embodiment of the display device to which the light route control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light route control member according to an embodiment will be described with reference to drawings. The light route control member described below relates to a switchable light route control member that drives in various modes according to the movement of electrophoretic particles application of a voltage.

Figure 1:
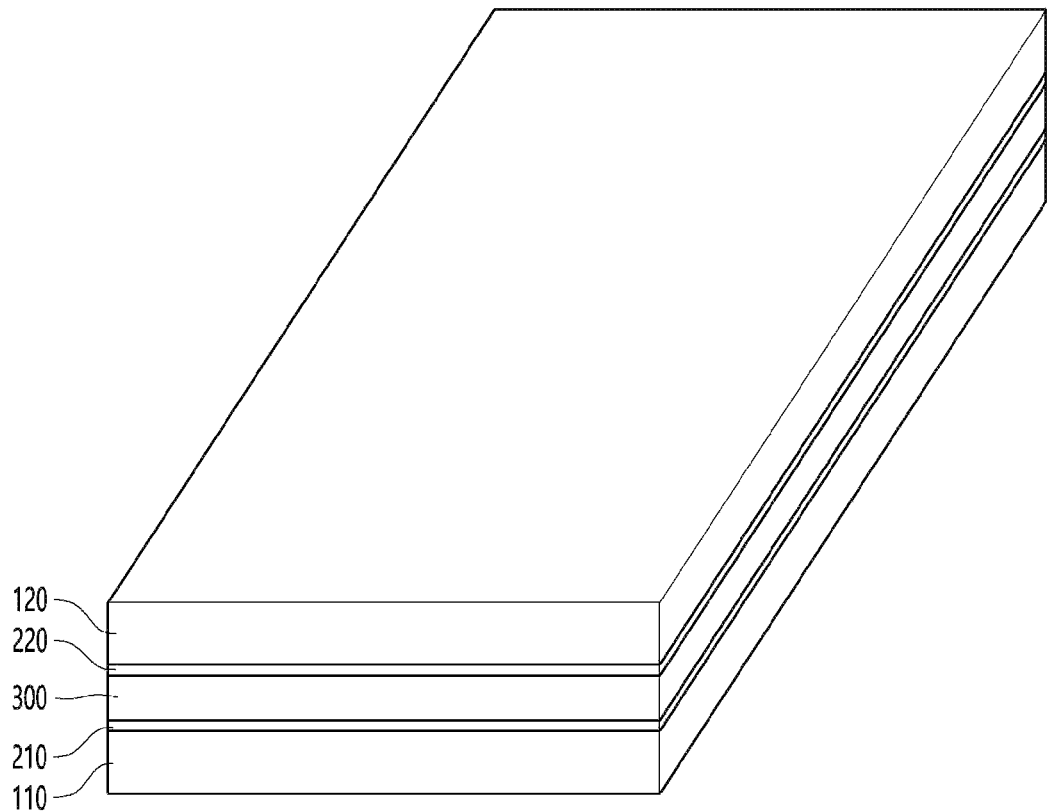
FIG. 1 is a view showing a perspective view of a light route control member according to an embodiment.
Figure 2:
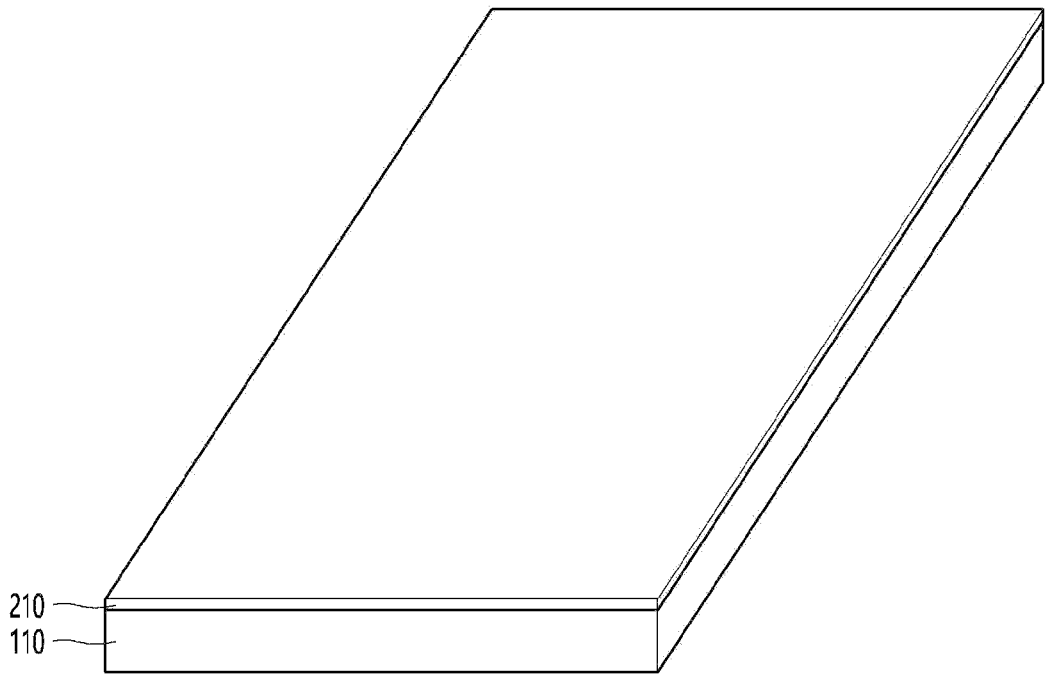
FIGS. 2 and 3 are views showing a perspective view of a first substrate and a first electrode, and a second substrate and a second electrode of the light route control member according to the embodiment, respectively.
Figure 3:
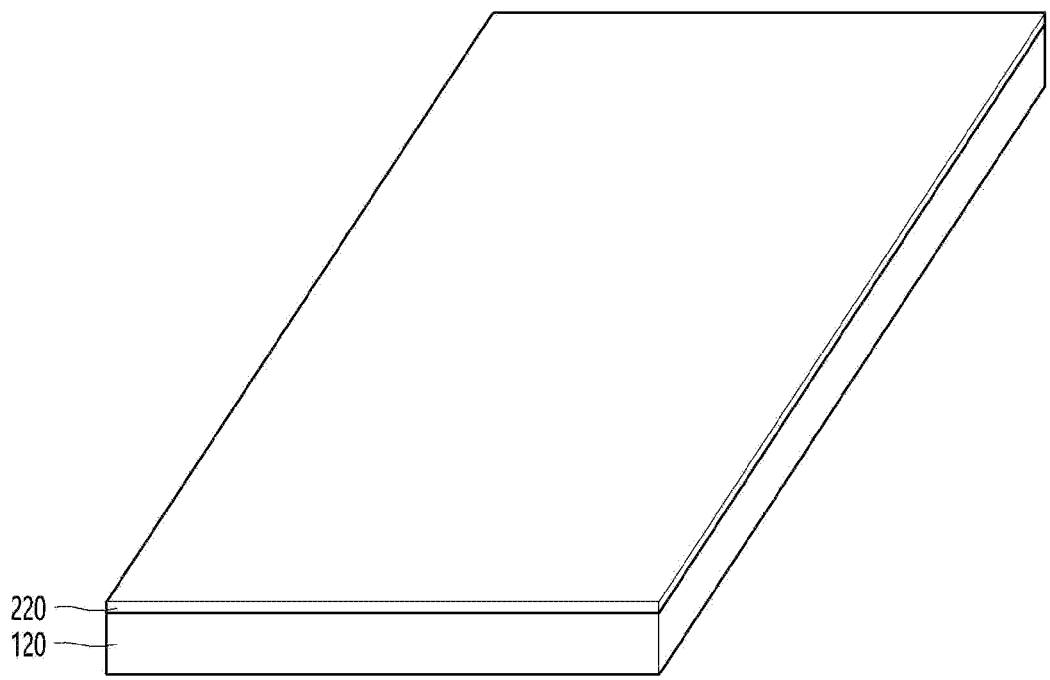

Referring to FIGS. 1 to 3, a light route control member according to an embodiment may include a first substrate 110, a second substrate 120, a first electrode 210, a second electrode 220, and a light conversion part 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the light route control member including the first substrate 110 may also be formed to have flexible, curved, or bent characteristics. Accordingly, the light route control member according to the embodiment may be changed to various designs.

The first substrate 110 may have a thickness of 30 um to 100 um.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more. In detail, the first electrode 210 may be disposed on the entire surface of one surface of the first substrate 110. That is, the first electrode 210 may be disposed as a surface electrode on the first substrate 110.

The first electrode 210 may have a thickness of about 0.1 um to about 0.5 um.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

The first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a predetermined pattern.

For example, the first electrode 210 may include a plurality of conductive patterns. In detail, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the light route control member according to the embodiment may be improved.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-buta-diene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the light route control member including the second substrate 120 may also be formed to have flexible, curved, or bent characteristics. Accordingly, the light route control member according to the embodiment may be changed to various designs.

The second substrate 120 may have a thickness of 30 um to 100 um.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more. In detail, the second electrode 220 may be disposed on the entire surface of one surface of the second substrate 120. That is, the second electrode 220 may be disposed on the second substrate 120 as a surface electrode.

The second electrode 220 may have a thickness of about 0.1 um to about 0.5 um.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo). gold (Au), titanium (Ti), and alloys thereof.

The second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a predetermined pattern.

For example, the second electrode 220 may include a plurality of conductive patterns. In detail, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the light route control member according to the embodiment may be improved.

The light conversion part 300 may be disposed between the first substrate 110 and the second substrate 120. In detail, the light conversion part 300 may be disposed between the first electrode 210 and the second electrode 220.

The light conversion part 300 may be bonded to the first electrode 210 and the second electrode 220. For example, a buffer layer for improving adhesion with the light conversion part 300 is disposed on the first electrode 210, and the first electrode 210 and the light conversion part 300 may be formed through the buffer layer. In addition, an adhesive layer 400 for adhesion to the light conversion part 300 is disposed under the second electrode 220, and the second electrode 220 and the light conversion part 300 may be adhered to each other through the adhesive layer 400.

Figure 4:
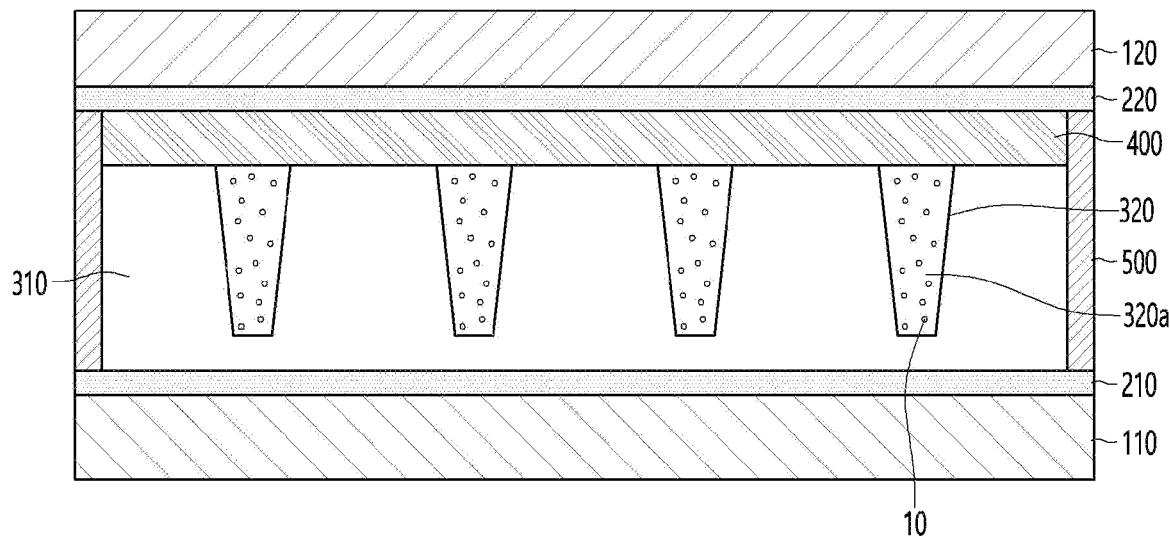
FIGS. 4 and 5 are views showing a cross-sectional view of a light route control member according to embodiment.
Figure 5:
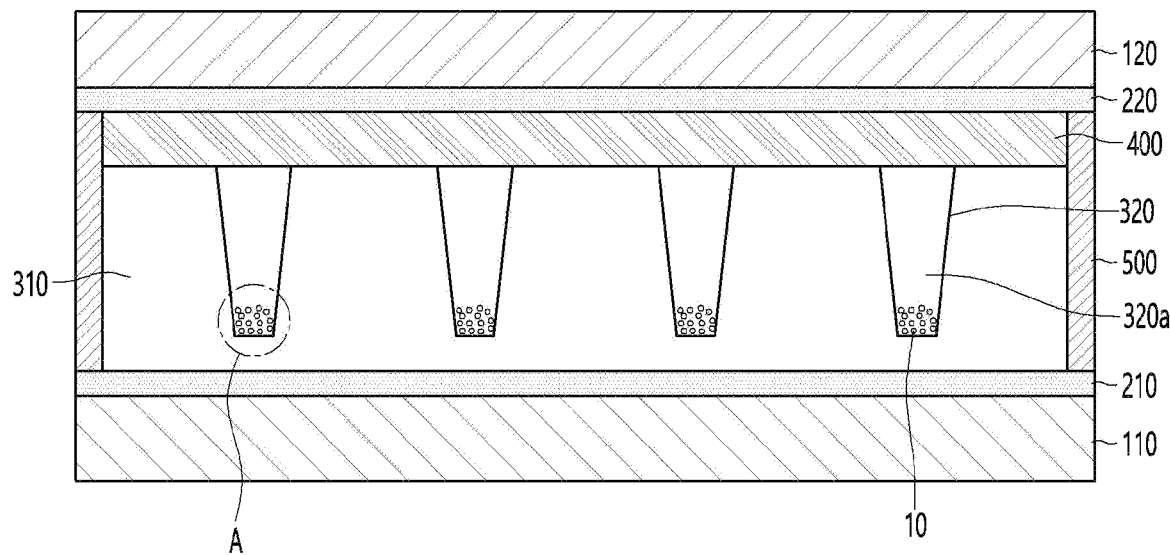

Referring to FIGS. 4 and 5, the light conversion part 300 may include a partition wall part 310 and a receiving part 320.

The partition wall part 310 may be defined as a partition wall part region that partitions the light transmitting portion. That is, the partition wall part 310 is a partition wall part region that partitions a plurality of light transmitting portions. In addition, the receiving part 320 may be defined as a region that changes into a light blocking part and a light transmitting part according to the application of a voltage.

That is, the receiving part 320 includes a plurality of receiving parts. In detail, the receiving part 320 includes a plurality of unit receiving cells. In more detail, the receiving part 320 includes a plurality of unit receiving cells spaced apart from each other.

The partition wall part 310 and the receiving part 320 may be alternately disposed with each other. The partition wall part 310 and the receiving part 320 may be disposed to have different widths. For example, the width of the partition wall part 310 may be greater than the width of the receiving part 320.

The partition wall part 310 and the receiving part 320 may be alternately disposed. In detail, the partition wall part 310 and the receiving part 320 may be alternately disposed. That is, each of the partition wall parts 310 may be disposed between the receiving parts 320 adjacent to each other, and each of the receiving parts 320 may be disposed between the partition wall parts 310 adjacent to each other.

The partition wall part 310 may contain a transparent material. The partition wall part 310 may contain a material that may transmit light.

The partition wall part 310 may contain a resin material. For example, the partition wall part 310 may contain a photo-curable resin material. As an example, the partition wall part 310 may contain a UV resin or a transparent photoresist resin. Alternatively, the partition wall part 310 may contain urethane resin or acrylic resin.

The partition wall part 310 may transmit light incident on any one of the first substrate 110 and the second substrate 120 toward another substrate.

For example, in FIGS. 4 and 5, light may be emitted from a lower portion of the first substrate 110 and may be incident in a direction toward the second substrate 120. The partition wall part 310 transmits the light, and the transmitted light may move to an upper portion of the second substrate 120.

A sealing part 500 sealing the light route control member may be disposed on a side surface of the partition wall part. And a side surface of the light conversion part 300 may be sealed by the sealing part.

The receiving parts 320 may include the dispersion 320a and the light absorbing particles 10 described above. In detail, the receiving part 320 is filled with the dispersion 320a, and a plurality of the light absorbing particles 10 may be dispersed in the dispersion 320a.

The dispersion 320a may be a material for dispersing the light absorbing particles 10. The dispersion 320a may contain a transparent material. The dispersion 320a may contain a non-polar solvent. In addition, the dispersion 320a may contain a material capable of transmitting light. For example, the dispersion 320a may include at least one of a halocarbon-based oil, a paraffin-based oil, and isopropyl alcohol.

The light absorbing particles 10 may be disposed to be dispersed in the dispersion 3201. In detail, the plurality of light absorbing particles 10 may be disposed to be spaced apart from each other in the dispersion 320a.

The light absorbing particles 10 may include a material capable of absorbing light. The light absorbing particles may have a color. In detail, the light absorbing particles 10 may include black particles capable of absorbing light. For example, the light absorbing particles may include carbon black particles.

Although not shown in the drawings, a sealing layer may be disposed on the upper portion of the receiving part 320. In detail, a sealing layer for sealing the dispersion from the outside may be disposed on the upper portion of the receiving part 320.

The light transmittance of the receiving part 320 may be changed by the light absorbing particles 10. In detail, the receiving part 320 may be changed into the light blocking part and the light transmitting part by changing the light transmittance due to the light absorbing particles 10. That is, the receiving part 320 may change the transmittance of the light passing through the receiving part 320 by dispersion and aggregation of the light absorbing particles 10 disposed therein in the dispersion 320a.

For example, the light route control member according to the embodiment may be changed from a first mode to a second mode or from the second mode to the first mode by a voltage applied to the first electrode 210 and the second electrode 220.

In detail, in the light route control member according to the embodiment, the receiving part 320 becomes the light blocking part in the first mode, and light of a specific angle may be blocked by the receiving part 320. That is, a viewing angle of the user viewing from the outside may be narrowed.

In addition, in the light route control member according to the embodiment, the receiving part 320 becomes the light transmitting part in the second mode, and in the light route control member according to the embodiment, light may be transmitted through both the partition wall part 310 and the receiving part 320. That is, the viewing angle of the user viewing from the outside may be widened.

Switching from the first mode to the second mode, that is, the conversion of the receiving part 320 from the light blocking part to the light transmitting part may be realized by movement of the light absorbing particles 10 of the receiving part 320. Thai is, the light absorbing particle 10 has a charge on the surface, and may be moved in the direction of the first electrode or the second electrode by the application of a voltage according to the characteristics of the charge. That is, the light absorbing particle 10 may be an electrophoretic particle.

In detail, the receiving part 320 may be electrically connected to the first electrode 210 and the second electrode 220.

In this case, when a voltage is not applied to the light route control member from the outside, the light absorbing particles 10 of the receiving part 320 are uniformly dispersed in the dispersion 320a, and light may be blocked by the light conversion particles in the receiving part 320. Accordingly, in the first mode, the receiving part 320 may be driven as the light blocking part.

Alternatively, when a voltage is applied to the light route control member from the outside, the light absorbing particles 10 may move. For example, the light absorbing particles 10 may move toward one end or the other end of the receiving part 320 by a voltage transmitted through the first electrode 210 and the second electrode 220. That is, the light absorbing particles 10 may move from the receiving part 320 toward the first electrode or the second electrode.

In detail, when a voltage is applied to the first electrode 210 and/or the second electrode 220, an electric field is formed between the first electrode 210 and the second electrode 220, and the charged carbon black, that is, the light absorbing particles may be moved toward a positive electrode of the first electrode 210 and the second electrode 220 using the dispersion 320a as a medium.

That is, when the voltage is not applied to the first electrode 210 and/or the second electrode 220, as shown in FIG. 4, the light absorbing particles 10 may be uniformly dispersed in the dispersion 320a to drive the receiving part 320 as the light blocking part.

In addition, when the voltage is applied to the first electrode 210 and/or the second electrode 220, as shown in FIG. 5, the light absorbing particles 10 may be moved toward the first electrode 210 in the dispersion 320a. That is, the light absorbing particles 10 are moved in one direction, and the receiving part 320 may be driven as the light transmitting part Accordingly, the light route control member according to the embodiment may be driven in two modes according to a user's surrounding environment. That is, when the user requires light transmission only at a specific viewing angle, the receiving part is driven as the light blocking part, or in an environment in which the user requires high brightness, a voltage may be applied to drive the receiving part as the light transmitting part.

Therefore, since the light route control member according to the embodiment may be implemented in two modes according to the user's requirement, the light route control member may be applied regardless of the user's environment.

Meanwhile, in the second mode in which the light absorbing particles 10 of the receiving part 320 move toward the electrode and the receiving part 320 is driven as a light transmitting part, the emitted light may pass through the receiving part.

In this case, the light is still blocked in the region where the light absorbing particles 10 are agglomerated among the receiving part 320 region, and accordingly, as the aggregation region increases, the region through which light is transmitted may be reduced.

Accordingly, the light route control member according to the embodiment may increase the light transmitting area of the receiving part in the second mode by controlling the particle size of the light absorbing particles.

Figure 6:
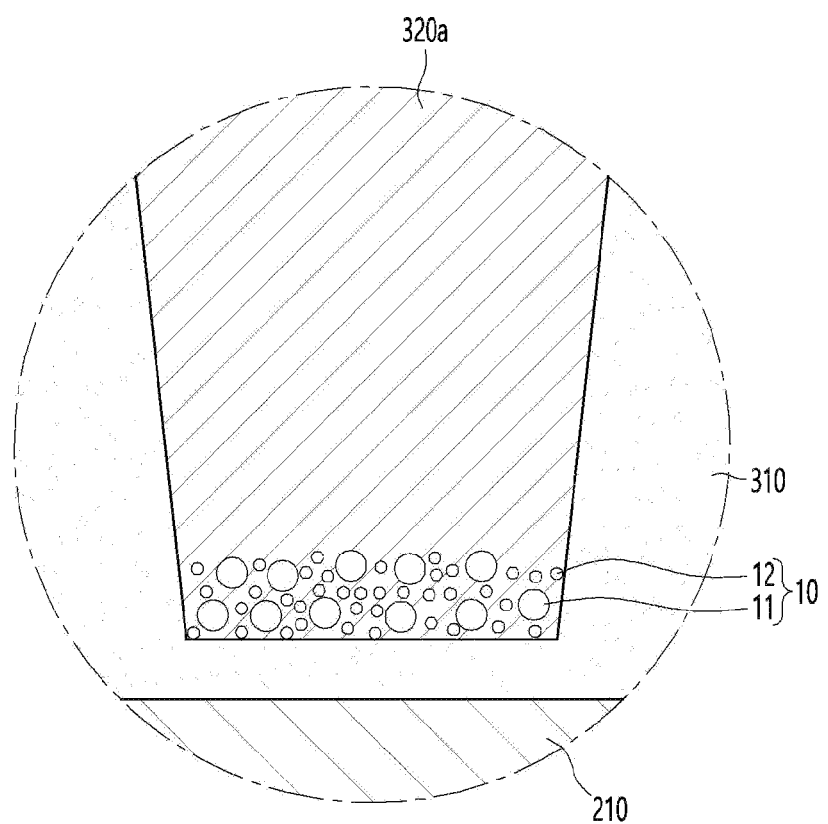
FIGS. 6 to 8 are views showing an enlarged view of area A of FIG. 5.

In detail, referring to FIG. 6, the light absorbing particle 10 may include a first particle 11 and a second particle 12.

The first particle 11 and the second particle 12 may include the same material. For example, the first particles 11 and the second particles 12 may include carbon black particles.

The first particle 11 and the second particle 12 may be formed in a spherical shape. In addition, the first particles 11 and the second particles 12 may be formed to have a particle diameter of a nano unit. In detail, the first particles 11 and the second particles 12 may be formed to have a particle diameter of 500 nm to 700 nm.

When the particle diameters of the first particles 11 and the second particles 12 are less than 500 nm, the first particles 11 and the second particles 12 are aggregated inside the dispersion 320a, and thus dispersibility may be reduced.

In addition, when the particle diameter of the first particle 11 and the second particle 12 exceeds 700 nm, the weight of the first particle 11 and the second particle 12 is increased, thereby the first particles 11 and the second particles 12 may be precipitated in the lower portion of the receiving part.

In addition, the first particles 11 and the second particles 12 may be charged with the same polarity. That is, the surfaces of the first particle 11 and the second particle 12 may be charged with (+) or (−) polarity. Accordingly, when a voltage is applied to the first electrode and/or the second electrode, the first particle 11 and the second particle 12 may move in the same direction as each other.

Also, the first particle 11 and the second particle 12 may have the same specific gravity. In detail, the specific gravity of the first particle 11 and the second particle 12 may be 2 or less.

The first particle 11 and the second particle 12 may have different sizes. In detail, the particle diameter of the first particle 11 and the particle diameter of the second particle 12 may be different from each other.

That is, light absorbing particles having different sizes may be disposed together in each of the receiving part of the light route control member. That is, by disposing the light absorbing particles having different sizes inside the receiving part 320 together, the same light absorbing effect can be realized. In addition, when power is applied and the light absorbing particles are aggregated into one region, the packing density of the aggregated light absorbing particles may be improved.

Referring to FIG. 6, the particle diameter of the first particle 11 may be larger than that of the second particle 12. A ratio of the particle diameter of the second particle 12 to the particle diameter of the first particle 11 may be 1:3 or more. In detail, the ratio of the particle diameter of the second particle 12 to the particle diameter of the first particle 11 may be 1:3 to 1:10.

When the ratio of the particle diameter of the second particle 12 to the particle diameter of the first particle 11 is less than 1:3, since the difference between the particle diameters of the first particles 11 and the second particles 12 is not large, the packing density of the light absorbing particles may be reduced. Accordingly, the transmittance effect may not be large.

In addition, when the ratio of the particle diameter of the second particle 12 to the particle diameter of the first particle 11 exceeds 1:10, any one particle become too large to reduce the packing density of the light absorbing particles, or any one particle may become too small to make it difficult to manufacture.

In addition, the first particle 11 and the second particle 12 may be included in different amounts. In detail, the total volume of the first particle 11 and the second particle 12 disposed inside any one of the receiving part may be different from each other. In detail, in at least one unit receiving cell among the plurality of unit receiving cells, the total volume of the first particles may be greater than the total volume of the second particles. That is, in all of the plurality of unit receiving cells, the total volume of the first particle is greater than the total volume of the second particle, or in some of the plurality of unit receiving cells, the total volume of the first particle is greater than the total volume of the second particle.

For example, in at least one unit receiving cell among the plurality of unit receiving cells, the second particle 12 having a relatively small particle size may be included in an amount of 5% by volume or more based on the total volume of the light absorbing particles. In detail, the second particle 12 may be included in an amount of 5% by volume to 20% by volume based on the total volume of the light absorbing particles.

When the second particle 12 is included in less than 5% by volume, the packing density is increased by the first particle 11, the transmittance improvement effect is small. And when the second particle 12 is included in an amount exceeding 20% by volume, the light absorption effect may be reduced, and thus the viewing angle control effect may be reduced.

Figure 7:
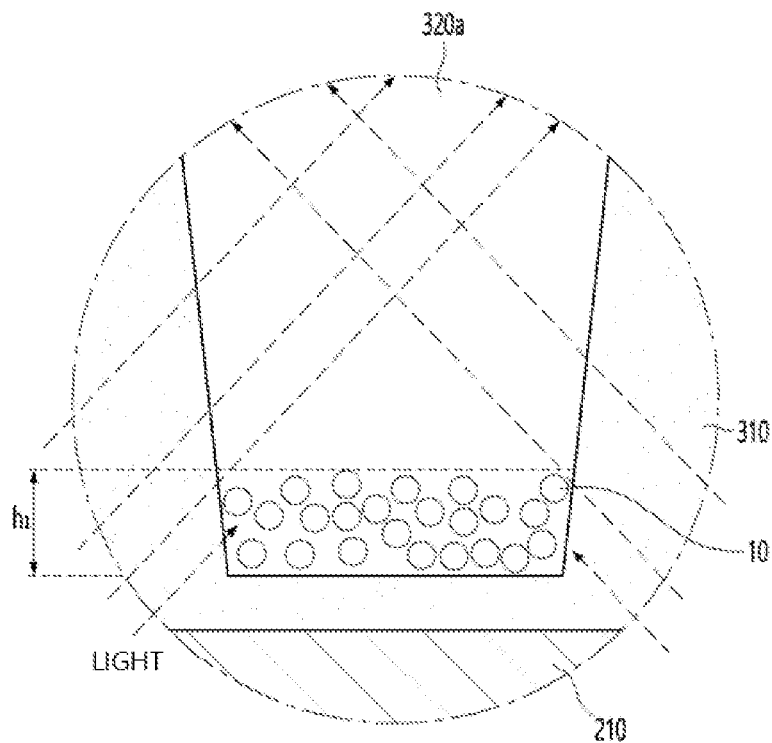
Figure 8:
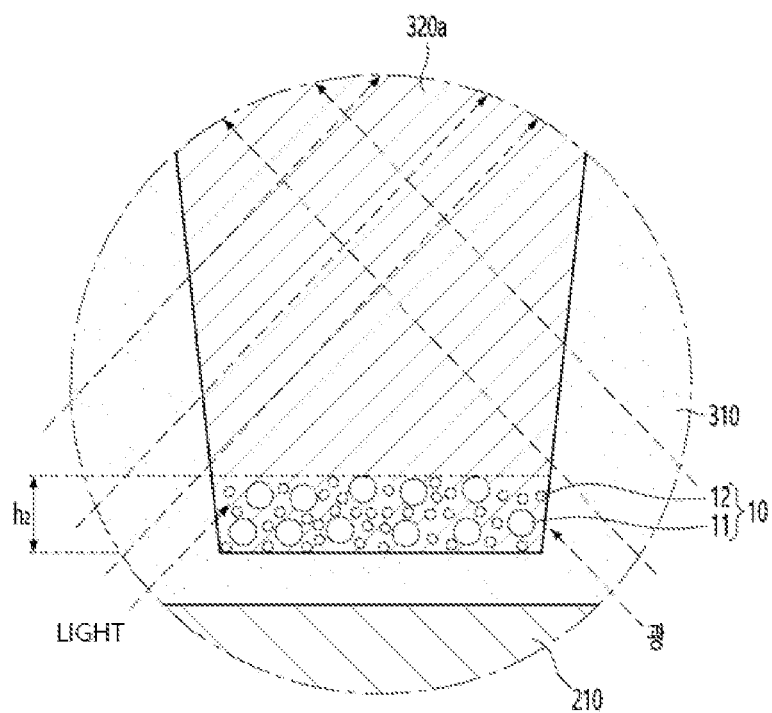

FIG. 7 is a view for explaining an example in which only light absorbing particles having the same particle size are disposed inside the receiving part 320, and FIG. 8 is a view for explaining an example in which light absorbing particles including first particles 11 and second particles 12 having different particle diameters are disposed inside the receiving part 320.

Referring to FIGS. 7 and 8, the second particle 12 may improve transmittance of the light route control member.

In detail, referring to FIG. 7, when only the light absorbing particles 10 having the same particle diameter are disposed inside the receiving part 320, in the second mode, the packing density of the light absorbing particles aggregated in the direction of the first electrode 210 may depend on the particle diameter of the light absorbing particles 10.

For example, referring to FIG. 7, due to the packing density of the light absorbing particles aggregated in the direction of the first electrode 210 in the second mode, the light absorbing particles 10 inside the receiving part have a first height h1.

In addition, referring to FIG. 8, when the light absorbing particles 10 including the first particles 11 and the second particles 12 having different particle diameters are disposed inside the receiving part 320, in the second mode, the packing density of the light absorbing particles aggregated in the direction of the first electrode 210 may depend on the volume % and particle size of the first particles 11 and the second particles 12.

For example, referring to FIG. 8, in the second mode, due to the packing density of the light absorbing particles aggregated in the direction of the first electrode 210, the light absorbing particles 10 may be disposed at a second height h2 inside the receiving part.

At this time, in the case of the light absorbing particles 10 including the first particles 11 and the second particles 12 having different particle diameters, compared to the light absorbing particles 10 having the same particle diameter, they may be agglomerated and disposed at a lower height inside the receiving part.

That is, in the case of the light absorbing particles 10 including the first particles 11 and the second particles 12 having different particle diameters, since it has an improved packing density compared to the light absorbing particles 10 having the same particle diameter, they may be aggregated and disposed at a low height inside the receiving part.

Accordingly, the aggregation height of the light absorbing particles may be reduced, thereby increasing the light transmitting area of the receiving part in the second mode.

Accordingly, by increasing the light transmission area in the second mode, the front luminance can be improved, thereby improving the user's visibility.

Meanwhile, the receiving part 320 may be formed in various shapes.

Referring to FIGS. 4 and 5, the receiving part 320 extends from one end of the receiving part 310 to the other end, and the width of the receiving part 320 may be changed.

For example, referring to FIGS. 4 and 5, the receiving part 320 may be formed in a trapezoidal shape. In detail, the receiving part 320 may be formed so that the width of the receiving part 320 is widened while extending from the first electrode 210 to the second electrode 220.

That is, the width of the receiving part 320 may be narrowed while extending in the opposite direction from the user's viewing surface. Also, when a voltage is applied to the light conversion part, the light absorbing particles of the receiving part 320 may move in a direction in which the width of the receiving part is narrowed.

That is, the width of the receiving part 320 may be increased while extending from the light incident part to which the light is incident to the light output part from which the light is emitted.

Accordingly, since the light absorbing particles move in a direction opposite to the viewing surface rather than the viewing surface, blocking of light emitted in the viewing surface direction can be inhibited, thereby improving the luminance of the light route control member.

In addition, since the light absorbing particles move from a wide region to a narrow region, the light absorbing particles may be easily moved.

In addition, since the light absorbing particles move to a narrow area of the receiving part, the amount of light transmitted in the direction of the user's viewing surface is increased, thereby improving the front luminance.

Alternatively, on the contrary, the receiving part 320 may be formed so that the width of the receiving part 320 is narrowed while extending from the first electrode 210 to the second electrode 220.

That is, the width of the receiving part 320 may be widened while extending from the user's viewing surface to the opposite surface direction. Also, when a voltage is applied to the light conversion part, the light absorbing particles of the receiving part 320 may move in a direction in which the width of the receiving part is widened.

That is, the width of the receiving part 320 may be narrowed while extending from the light incident part to which the light is incident to the light output part from which the light is emitted.

Accordingly, the contact area between the first electrode and one surface of the receiving part through which the light absorbing particles move is increased, so that the moving speed of the light absorbing particles, that is, the driving speed may be increased.

In addition, the receiving part 320 may be disposed to be spaced apart from the first electrode 210 or the second electrode 220.

For example, referring to FIGS. 4 and 5, the receiving part 320 may be spaced apart from the first electrode 210 and may indirectly contact the second electrode 220.

The same or similar material to the partition wall part 310 may be disposed in a region where the receiving part 320 and the first electrode 220 are spaced apart from each other.

Figure 9:
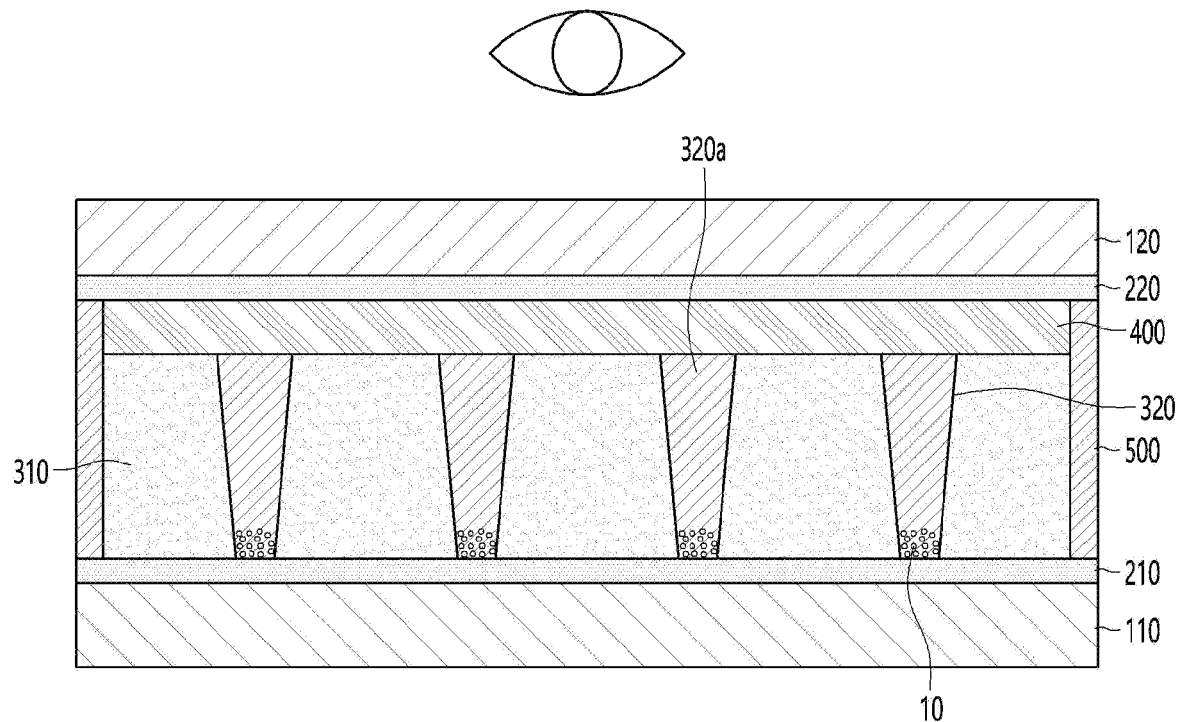
FIGS. 9 to 12 are views showing another cross-sectional view of a light route control member according to embodiment.
Figure 10:
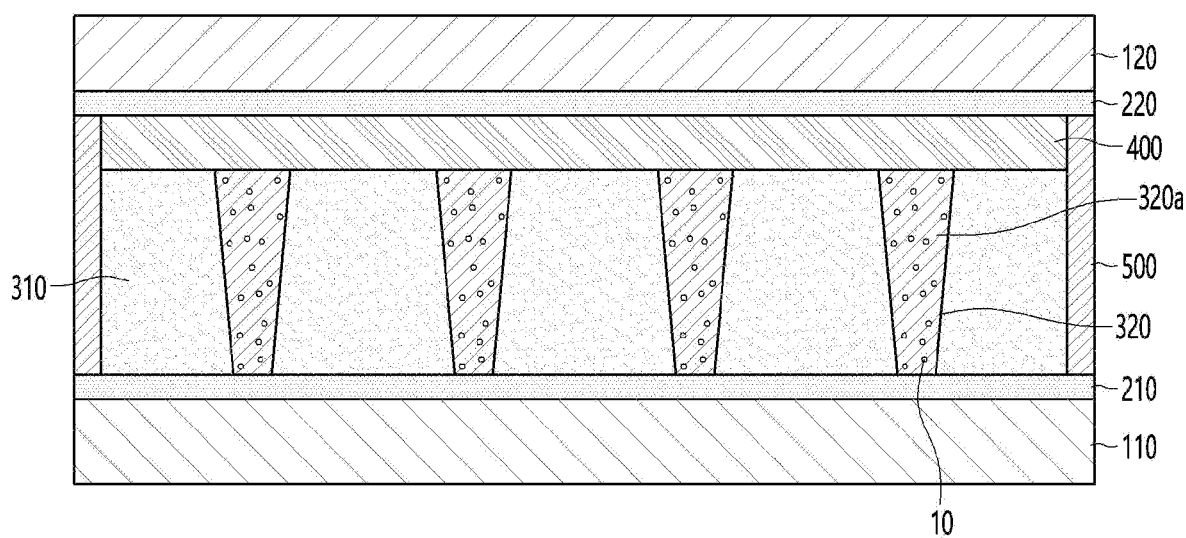

Alternatively, the embodiment is not limited thereto, and as shown in FIGS. 9 and 10, both ends of the receiving part may be respectively disposed in direct or indirect contact with the first electrode 210 and the second electrode 220.

Accordingly, since the receiving part 320 is in direct contact with the first electrode 210 and the second electrode 220, the voltage is easily transferred in the direction of the receiving part 320 without being affected by the resistance, so that the driving characteristics can be improved.

Figure 11:
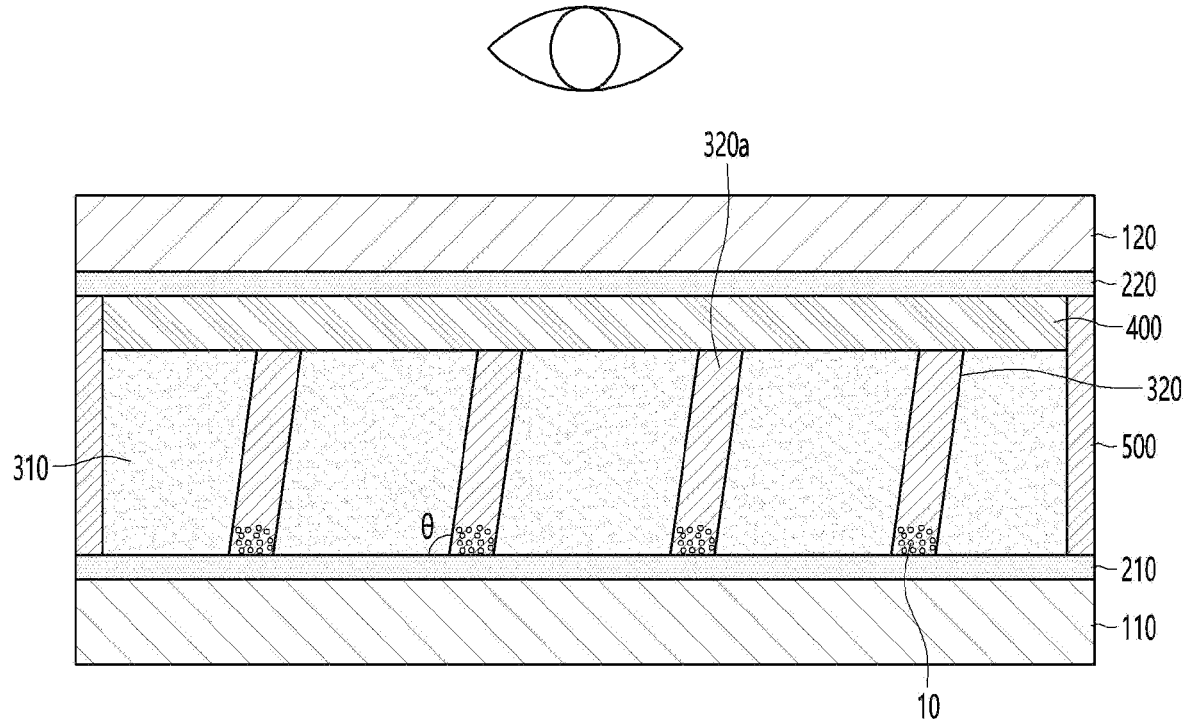
Figure 12:
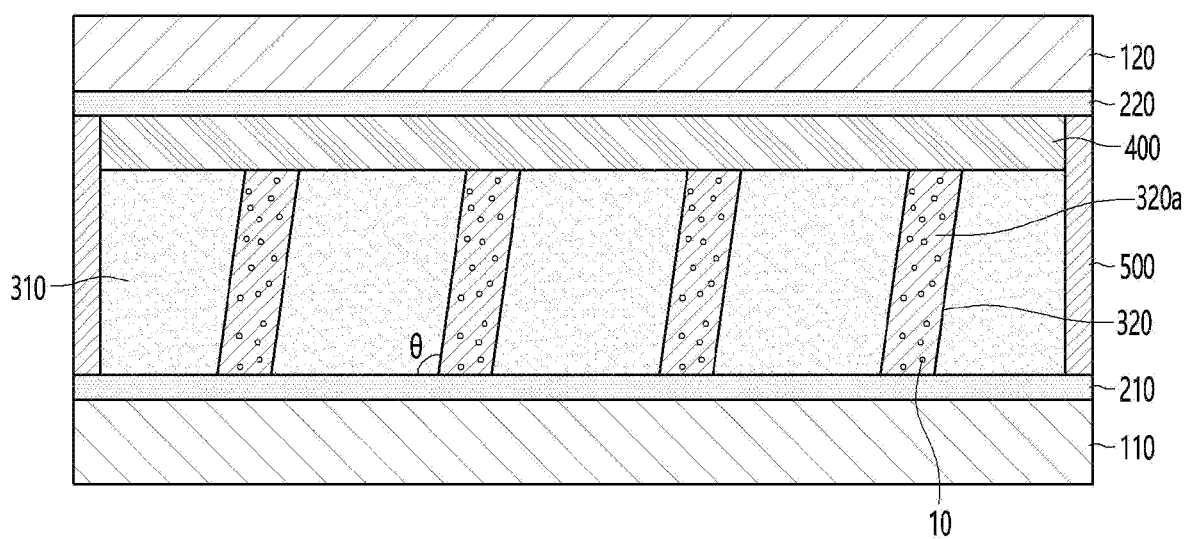

In addition, the receiving part 320 may be disposed with a constant inclination angle θ. In detail, referring to FIGS. 11 and 12, the receiving part 320 may be disposed while having an inclination angle θ of greater than 0° to less than 90° with respect to the first electrode 210. In detail, the receiving part 320 may extend upwardly while having an inclination angle θ of greater than 0° to less than 90° with respect to one surface of the first electrode 210.

Accordingly, when the light route member is used together with the display panel, moire caused by the overlapping between the pattern of the display panel and the receiving part 320 of the light route member may be inhibited, thereby improving user visibility.

Hereinafter, a light route control member according to another embodiment will be described with reference to FIGS. 13 to 15.

Figure 13:
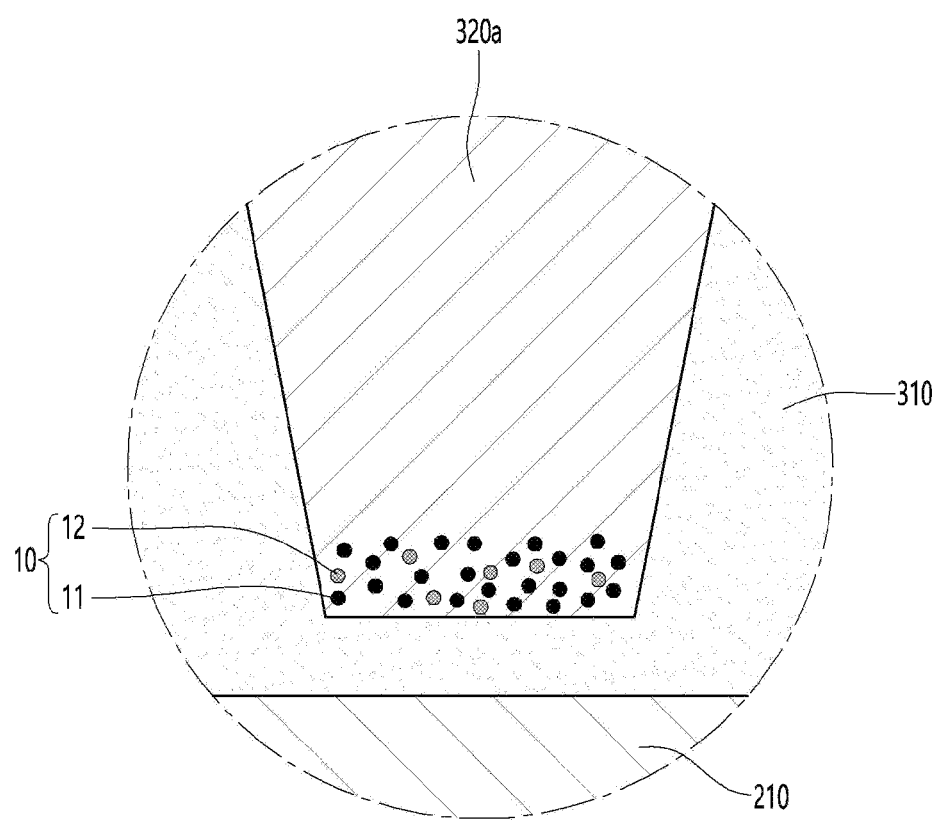
Figure 14:
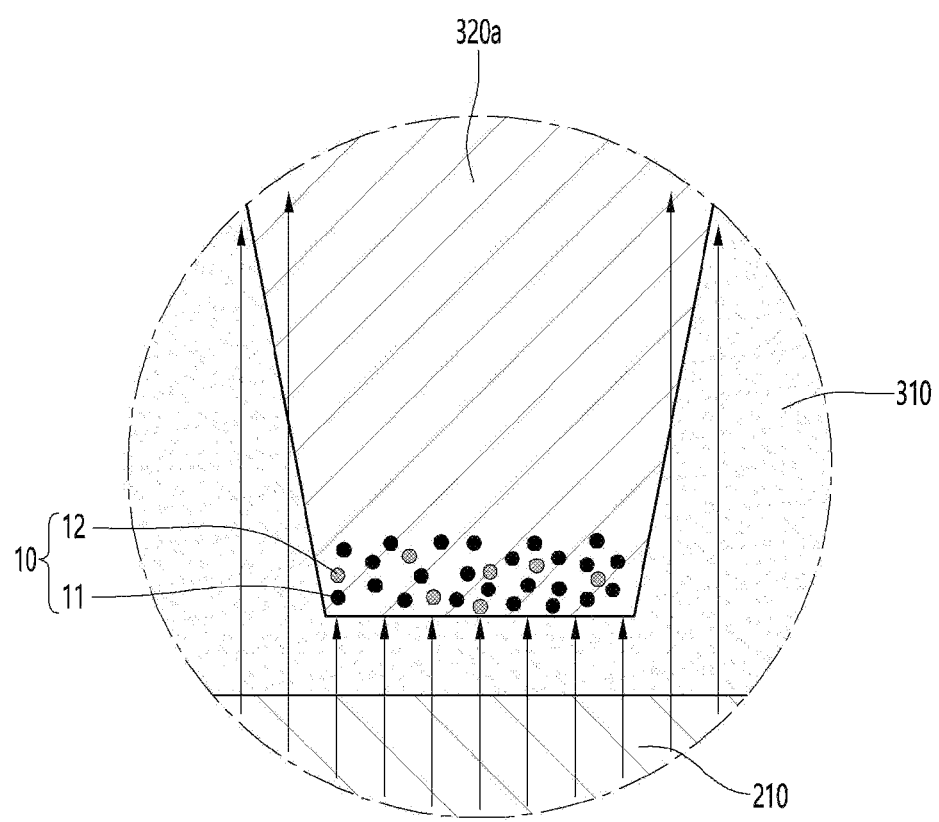

FIGS. 13 to 15 are views illustrating other enlarged views of area A of FIG. 5.

Referring to FIG. 13, the light absorbing particle 10 may include a first particle 11 and a second particle 12.

The first particle 11 and the second particle 12 may be disposed together in the dispersion 320a. In detail, the first particles 11 and the second particles 12 may be separated from each other and dispersed in the dispersion 320a.

The first particle 11 and the second particle 12 may have different reflectivity. In detail, the reflectance of the first particle 11 may be smaller than the reflectance of the second particle 12. For example, the reflectance of the first particle 11 may be about 0.1% or less, and the reflectance of the second particle 12 may be about 50% to about 90%.

That is, the light incident on the first particle 11 is hardly reflected, the first particle 11 can absorb it, and the light incident to the second particle 12 may be reflected and scattered by about 50% to about 90%.

In detail, the first particle 11 may absorb the light incident into the receiving part 320. That is, the receiving part 320 may be changed into a light transmitting part and a light blocking part by the first particle 11. That is, the first particles 11 may be light absorbing particles.

The first particles 11 may be formed in a spherical shape. In addition, the first particles 11 may be formed to have a particle diameter of a nano unit. In detail, the first particles 11 may be formed to have a particle diameter of 500 nm to 700 nm.

When the particle diameter of the first particles 11 is less than 500 nm, dispersibility may be reduced due to aggregation of the first particles 11 inside the dispersion 320a.

In addition, when the particle diameter of the first particle 11 exceeds 700 nm, the weight of the first particle 11 may be increased, so that the first particle 11 may be precipitated into the lower portion of the receiving part.

The first particles 11 may have a color. In detail, the first particles 11 may include black particles. For example, first particles 11 may include carbon black.

The second particle 12 may partially absorb and partially reflect light incident into the receiving part. That is, the second particle 12 may have both reflection and absorption characteristics. That is, the second particles 12 may be light scattering particles.

The second particle 12 may be formed in a spherical shape. In addition, the second particles 12 may be formed to have a particle diameter of a nano unit. In detail, the second particles 12 may be formed to have a particle diameter of 500 nm to 700 nm. The first particles 11 and the second particles 12 may have the same or similar particle diameters within the particle diameter size range.

When the particle diameter of the second particles 12 is less than 500 nm, the second particles 12 may agglomerate inside the dispersion 320a, so that dispersibility may be reduced.

In addition, when the particle diameter of the second particle 12 exceeds 700 nm, the weight of the second particle 12 may be increased, so that the second particle 12 may be precipitated into the lower portion of the receiving part.

The second particle 12 may have a color. In detail, the second particles 12 may include black particles.

The second particle 12 may include a metal. In detail, the second particle 12 may include a metal oxide. For example, the second particle 12 may include at least one of titanium dioxide ($TiO_2$), zirconium oxide ($ZrO_2$), indium oxide ($In2O_3$), tin oxide ($SnO_2$), and aluminum oxide ($Al_2O_3$).

In addition, the first particles 11 and the second particles 12 may be charged with the same polarity. That is, the surfaces of the first particle 11 and the second particle 12 may be charged with (+) or (−) polarity. Accordingly, when a voltage is applied to the first electrode and/or the second electrode, the first particle 11 and the second particle 12 may move in the same direction.

In addition, the first particle 11 and the second particle 12 may have different specific gravity. In detail, the specific gravity of the first particle 11 may be smaller than the specific gravity of the second particle 12. For example, the specific gravity of the first particle 11 may be 2 or less, and the specific gravity of the second particle 12 may be 3 to 8.

A dispersing agent for facilitating dispersion of the first particles 11 and the second particles 12 may be further included in the receiving part. In detail, in order to inhibit a phase separation due to a difference in specific gravity between the first particles 11 and the second particles 12 containing different materials, the dispersing agent for inducing dispersion of the first particles 11 and the second particles 12 may be further included in the receiving part.

FIG. 14 is a view for explaining an example in which only the first particle 11 is disposed inside the receiving part 320, and FIG. 15 is a view for explaining an example in which the first particle 11 and the second particle 12 are disposed together in the receiving part 320.

Referring to FIGS. 14 and 15, the second particle 12 may improve the front luminance of the light route control member.

In detail, referring to FIG. 14, when only the first particles 11, that is, only light absorbing particles are disposed in the receiving part 320, most of the light incident in the direction of the receiving part may be blocked by the aggregated first particles. That is, since the light incident in the direction of the receiving part is blocked and cannot be emitted in the direction of the user, the front luminance of the light route control member may be reduced. In addition, since the light incident in the direction of the receiving part is blocked, the brightness in a specific area becomes smaller than the brightness in other areas, the luminance uniformity of the light route control member may be reduced.

However, referring to FIG. 15, when the first particle 11 and the second particle 12 are disposed together in the receiving part 320, the amount of light emitted toward the user by the second particles 12 may be increased.

In detail, referring to FIG. 15, light incident to the second particles 12 by the second particles 12 that are aggregated together with the first particles 11 may be scattered and refracted.

Accordingly, it is possible to increase the amount of light emitted in the direction of the user passing through the receiving part by reflection and refraction of light through the second particles 12.

Accordingly, the front luminance of the light route control member can be improved, and the luminance uniformity of the light route control member can be improved.

Meanwhile, the first particle 11 and the second particle 12 may be included in different weight %. In detail, the first particles 11 in each receiving part may be included in more than the second particles 12.

In detail, the first particles 11 inside each receiving part may be included in an amount of 95 wt % to 99 wt % with respect to the total particles. In addition, the second particle 12 may be included in an amount of 1 wt % to 5 wt % based on the total particles.

When the second particle 12 is included in less than about 1% by weight based on the total particles, since the light scattering effect of the second particle is small, it is difficult to improve the front transmittance. In addition, when the second particle 12 is included in an amount greater than about 5% by weight based on the total particles, since the amount of the first particles is reduced, the light absorption rate in the receiving part may be reduced, and the change in the front transmittance improvement may be insignificant.

Hereinafter, the present invention will be described in more detail through the transmittance of the light route control member according to Examples and Comparative Examples. These embodiments are merely presented as examples in order to explain the present invention in more detail. Therefore, the present invention is not limited to these examples.

EXAMPLE 1

First and second electrodes including indium tin oxide (ITO) were respectively formed on one surface of the first and second substrates including polyethylene terephthalate (PET).

Then, a UV resin was disposed on the first substrate and imprinted through a mold to form a receiving part.

Then, the light conversion part was formed by filling the receiving part with paraffinic oil in which carbon black particles and titanium dioxide particles were dispersed.

At this time, the titanium dioxide particles were included in 5% by weight based on the total particles.

Next, after the first substrate, the second substrate, and the light conversion part were adhered to prepare a light route control member, when a voltage was applied, the front transmittance of the light route control member was measured.

EXAMPLE 2

Except that the paraffinic oil in which carbon black particles and zirconium oxide particles are dispersed inside the receiving part was filled, after the light route control member was manufactured in the same manner as in Example 1, when a voltage was applied, the front transmittance of the light route controlling member was measured.

At this time, the zirconium oxide particles were included in 5% by weight based on the total particles.

EXAMPLE 3

Except that the paraffinic oil in which carbon black particles and indium oxide particles are dispersed inside the receiving part was filled, after the light route control member was manufactured in the same manner as in Example 1, when a voltage was applied, the front transmittance of the light route controlling member was measured.

At this time, the indium oxide particles were included in 5% by weight based on the total particles.

EXAMPLE 4

Except that the paraffinic oil in which carbon black particles and tin oxide particles are dispersed inside the receiving part was filled, after the light route control member was manufactured in the same manner as in Example 1, when a voltage was applied, the front transmittance of the light route controlling member was measured.

At this time, the tin oxide particles were included in 5% by weight based on the total particles.

EXAMPLE 5

Except that the paraffinic oil in which carbon black particles and aluminum oxide particles were dispersed was filled in the accommodating p oxide particles are dispersed inside the receiving part was filled, after the light route control member was manufactured in the same manner as in Example 1, when a voltage was applied, the front transmittance of the light route controlling member was measured.

At this time, the aluminum oxide particles were included in 5% by weight based on the total particles.

COMPARATIVE EXAMPLE 1

Except for the fact that the paraffinic oil in which only carbon black particles are dispersed inside the receiving part was filled, after the light route control member was manufactured in the same manner as in Example 1, when a voltage was applied, the front transmittance of the light route control member was measured.

COMPARATIVE EXAMPLE 2

Except that titanium dioxide particles were included in 7% by weight based on the total particles, after the light route control member was manufactured in the same manner as in Example 1, when a voltage was applied, the front transmittance of the light route control member was measured.

COMPARATIVE EXAMPLE 3

Except that zirconium dioxide particles were included in 7% by weight based on the total particles, after the light route control member was manufactured in the same manner as in Example 2, when a voltage was applied, the front transmittance of the light route control member was measured.

COMPARATIVE EXAMPLE 4

Except that indium oxide particles were included in 7% by weight based on the total particles, after the light route control member was manufactured in the same manner as in Example 3, when a voltage was applied, the front transmittance of the light route control member was measured.

COMPARATIVE EXAMPLE 5

Except that tin oxide particles were included in 7% by weight based on the total particles, after the light route control member was manufactured in the same manner as in Example 4, when a voltage was applied, the front transmittance of the light route control member was measured.

COMPARATIVE EXAMPLE 6

Except that aluminum oxide particles were included in 7% by weight based on the total particles, after the light route control member was manufactured in the same manner as in Example 6, when a voltage was applied, the front transmittance of the light route control member was measured.

TABLE 1

|  | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
| --- | --- | --- | --- | --- | --- | --- | --- | --- | --- | --- | --- |
| Transmittance (%) | 52 | 46 | 42 | 43 | 45 | 40 | 56 | 49 | 42 | 44 | 47 |

Referring to Table 1, the front transmittance of the light route control member according to Examples 1 to 5 is greater than the front transmittance of the light route control member according to Comparative Example.

That is, when the voltage is applied to the light route control member according to Examples 1 to 5 to drive the receiving part to the light transmitting part, the amount of light moving in the front direction is increased by the metal oxide particles that reflect and scatter light.

In addition, when the metal oxide particles exceed 5% by weight based on the total particles, the effect of improving the front transmittance may be small due to an increase in the side transmittance rather than the front transmittance.

Hereinafter, a light route control member according to another embodiment will be described with reference to FIGS. 16 to 18.

Figure 17:
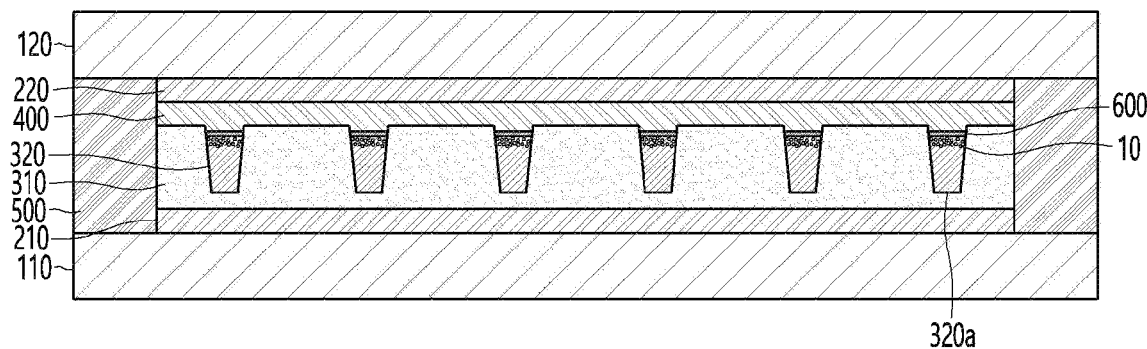
Figure 18:
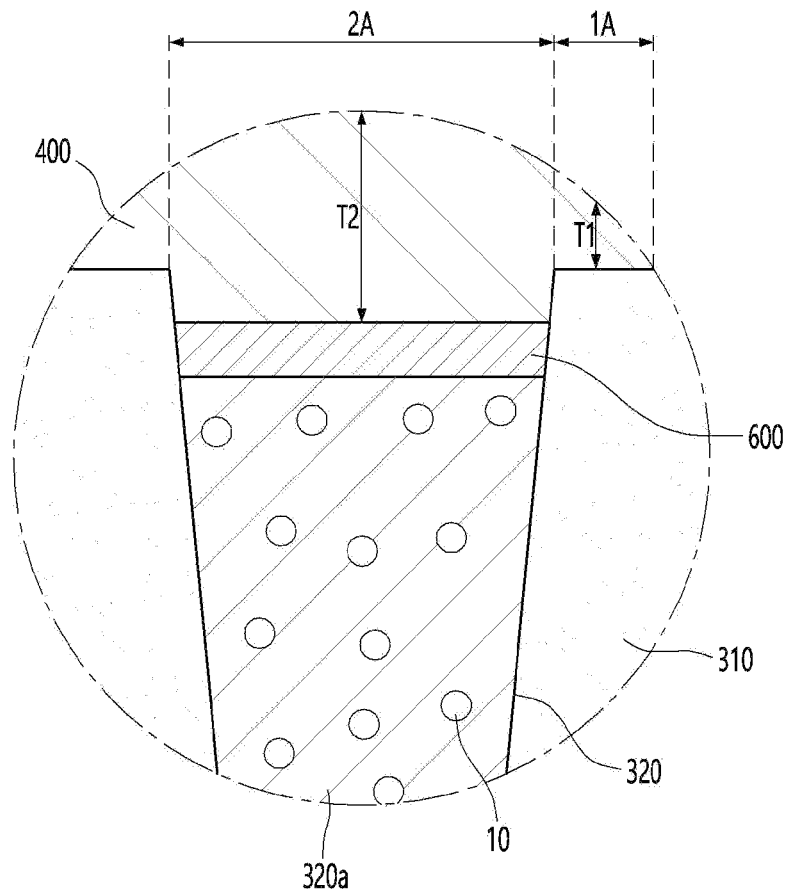
FIG. 18 are views showing an enlarged view of area A of FIG. 16

Referring to FIGS. 16 to 18, an adhesive layer 400 is disposed between the second substrate 120 and the light conversion part 300, and the second substrate 120 and the light conversion part 300 may be adhered to each other by the adhesive layer 400.

The adhesive layer 400 may have a dielectric constant. Also, the adhesive layer 400 may have a polarity. For example, the adhesive layer 400 may include an optically clear adhesive (OCA).

The adhesive layer 400 may be disposed on the first substrate 110 to have different thicknesses for each region.

In detail, referring to FIG. 18, the first substrate 110 includes a first region 1A corresponding to the partition wall part 310 and a second region 2A corresponding to the receiving part 320, and the adhesive layer 400 may be disposed to have different thicknesses in the first area 1A and the second area 2A.

In detail, the adhesive layer thickness T2 of the second region may be greater than the adhesive layer thickness T1 of the first region. That is, the adhesive layer of the second region is disposed while partially filling the inside of the receiving part 320, it may be disposed to be thicker than the adhesive layer in the first region by the same thickness as the adhesive layer disposed in the receiving part 320.

Since the adhesive layer 400 is disposed on the first substrate 110 in different thicknesses for each region, the adhesive surface of the adhesive layer may be formed in a concave-convex shape. Accordingly, after bonding the first substrate 110 and the light conversion part 300 through the adhesive layer 400, adhesion of the light conversion part 300 may be improved by the concavo-convex shape.

Accordingly, it is possible to inhibit the light conversion part 300 from being removed from the substrate, thereby improving the reliability of the light route control member.

Meanwhile, a sealing layer 600 may be disposed in the receiving part 320. In detail, a sealing layer 600 may be disposed in the receiving part 320. The sealing layer 600 may be disposed on the adhesive layer 400 disposed inside the receiving part 320. That is, the adhesive layer 400 under the second substrate 120, the sealing layer 600, and the dispersion 320a in which the light absorbing particles are dispersed may be sequentially disposed in the receiving part 320.

The sealing layer 600 inhibits the dispersion 320a from being changed by exposing the dispersion 320a to the outside, and a degeneration of the light absorbing particles 10 inside the dispersion 320a can be inhibited.

The sealing layer 600 may be disposed only in a specific area. That is, the sealing layer 600 may be disposed only inside the receiving part 320, and may not be disposed on an area corresponding to the partition wall part 310.

Accordingly, the adhesive layer 400 may be in direct contact with the partition wall part 310 of the light conversion part, thereby the adhesive properties of the adhesive layer 400 may be improved.

In addition, direct contact between the adhesive layer 400 and the dispersion 320a may be inhibited by the sealing layer 600.

In the case of the adhesive layer 400 including an optically transparent adhesive, when the adhesive layer has dielectric properties, it may have a polarity. Accordingly, when the dispersion having a polarity and the adhesive layer 400 are in direct contact, the properties of the adhesive layer at the interface may be reduced.

That is, as the adhesive layer 400 and the dispersion 320a come into direct contact with each other, the adhesive properties of the adhesive layer 400 and the polarity of the dispersion 320a may decrease.

Accordingly, by disposing the sealing layer 600 between the adhesive layer 400 and the dispersion 320a, direct contact between the adhesive layer 400 and the dispersion 320a can be inhibited. That is, a sealing layer having no polarity may be in direct contact with the adhesive layer and the dispersion between the adhesive layer and the dispersion.

Accordingly, by maintaining the adhesive properties of the adhesive layer, it is possible to improve the adhesive properties of the first substrate and the light conversion part, and by inhibiting the polarity of the dispersion from being lowered, it is possible to inhibit the movement speed of the light absorbing particles from being reduced in the dispersion.

The sealing layer 600 may be formed by curing a sealing material. In this case, the specific gravity of the sealing layer 600 may be different from the specific gravity of the dispersion 320a. In detail, the specific gravity of the sealing layer 600 may be greater than the specific gravity of the dispersion 320a.

For example, the specific gravity of the dispersion 320a may be 0.7 to 0.9. In addition, the specific gravity of the sealing material forming the sealing layer may be greater than 0.9 to 2.2. In detail, the sealing material may include a polymer material having a specific gravity of greater than 0.9 to 2.2. For example, the sealing material may include a material such as urethane acrylate or epoxy having a specific gravity of greater than 0.9 to 2.2.

Conventionally, a photo-curable resin layer is coated on a substrate, an intaglio-shaped receiving part is formed on the resin layer by an imprinting process, and then the receiving part is filled with a dispersion in which light absorbing particles are dispersed. Then, a sealing material was coated on the dispersion, and then the sealing material was cured to form a sealing layer.

In this case, when the specific gravity of the sealing material is higher than the specific gravity of the dispersion, due to the problem of the sealing material penetrating into the lower part of the dispersion, there was a problem in that a sealing material lower than the specific gravity of the dispersion should be used.

That is, due to the process sequence of the sealing material and the dispersion, there was a limitation in material selection according to the specific gravity of the sealing material and the dispersion.

However, in the light route control member according to the embodiment, the specific gravity of the sealing material may be higher than the specific gravity of the dispersion. Accordingly, since a sealing material having a higher specific gravity than the dispersion may be used, the range of selection of the sealing material may be increased. In addition, since a dispersion having high dielectric properties and low viscosity can be applied as the dispersion uses a material with a large specific gravity, it is possible to improve the movement speed of the light absorbing particles in the dispersion.

In addition, since the specific gravity of the sealing material is greater than the specific gravity of the dispersion, the dispersion may be disposed by moving from the inside of the receiving part to the upper part, and the sealing material may be disposed by moving downward in the receiving part.

Accordingly, it is possible to inhibit the partition wall part from being contaminated by the dispersion that overflows in the direction of the partition wall part under the receiving part.

That is, by making the specific gravity of the sealing material larger than the specific gravity of the dispersion, it is possible to inhibit the dispersion from overflowing to the outside.

Hereinafter, referring to FIGS. 19 to 21, a display device and a display apparatus to which a light route control member according to an embodiment is applied will be described.

Figure 19:
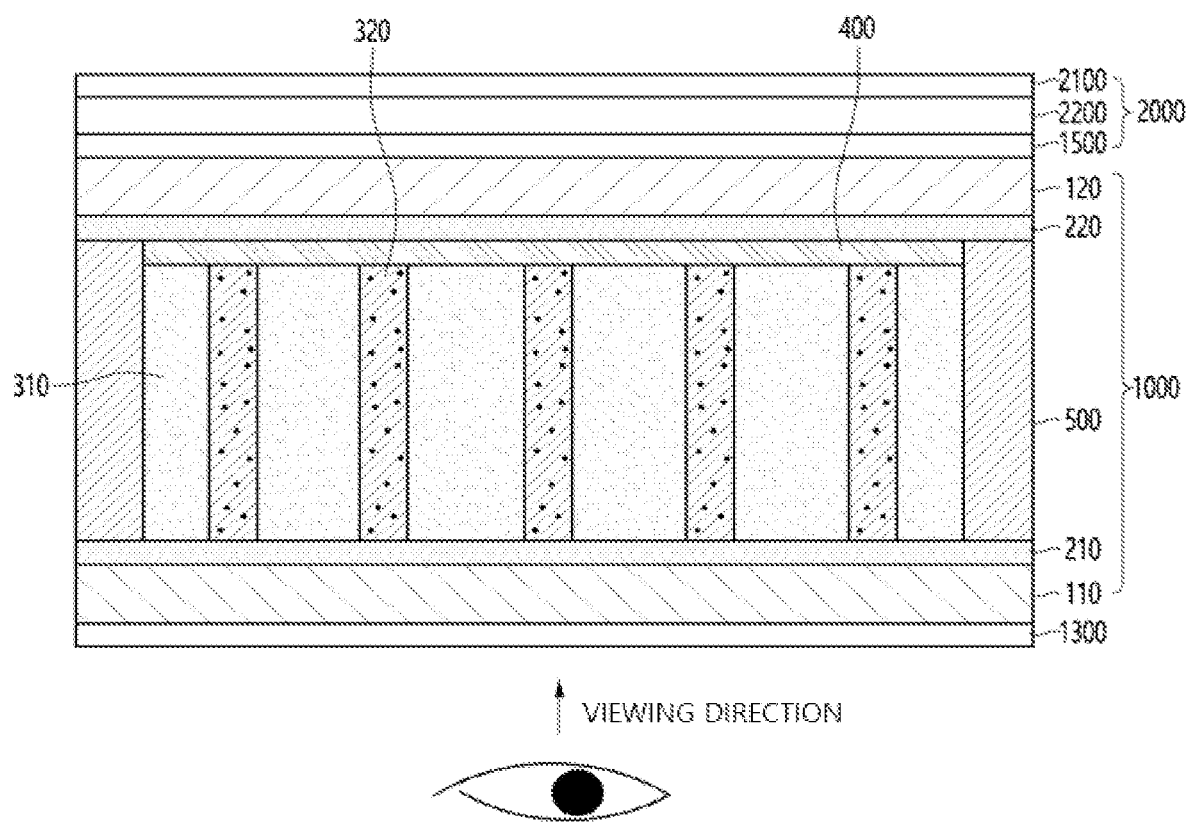
FIG. 19 is a cross-sectional view of a display device to which a light route control member according to an embodiment is applied.

Referring to FIG. 19, a light route control member 1000 according to an embodiment may be disposed on a display panel 2000.

The display panel 2000 and the light route control member 1000 may be disposed to be adhered to each other. For example, the display panel 2000 and the light route control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the light route control member and the display panel, the light route control member and the display panel may be adhered after the release film is removed.

The display panel 2000 may include a first substrate 2100 and a second substrate 2200. When the display panel 2000 is a liquid crystal display panel, the light route control member may be formed under the liquid crystal panel. That is, when the user-viewed side of the liquid crystal panel is defined as the upper portion of the liquid crystal panel, the light route control member may be disposed below the liquid crystal panel. The display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first substrate 2100 and the second substrate 2200 is bonded to the first substrate 2100 with the liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000. The backlight unit may be disposed under the light route control member.

That is, as shown in FIG. 18, the light route control member may be disposed under the liquid crystal panel.

Alternatively, when the display panel 2000 is an organic light emitting display panel, the light route control member may be formed on the organic light emitting display panel. That is, when the surface viewed by the user of the organic light emitting display panel is defined as the upper portion of the organic light emitting display panel, the light route control member may be disposed on the organic light emitting display panel. The display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, the second substrate 2200 configured to function as an encapsulation substrate for encapsulation may further be included on the organic light emitting element.

Furthermore, although not shown in drawings, a polarizing plate may be further disposed between the light route control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting display panel, the polarizing plate may be the external light reflection preventive polarizing plate.

In addition, an additional functional layer 1300 such as an anti-reflection layer, an anti-glare, or the like may be further disposed on the light route control member 1000. Specifically, the functional layer 1300 may be adhered to one surface of the substrate of the light route control member. Although not shown in drawings, the functional layer 1300 may be adhered to the base 100 of the light route control member via an adhesive layer. In addition, a release film for protecting the functional layer may be further disposed on the functional layer 1300.

Further, a touch panel may be further disposed between the display panel and the light route control member.

Although it is shown in the drawings that the light route control member is disposed at an upper portion of the display panel, but the embodiment is not limited thereto, and the light route control member may be disposed at various positions such as a position in which light is adjustable, that is, a lower portion of the display panel, between a second substrate and a first substrate of the display panel, or the like.

Referring to FIGS. 20 and 21, the light route control member according to the embodiment may be applied to a vehicle.

Referring to FIGS. 20 and 21, the light route control member according to the embodiment may be applied to a display device that displays a display.

For example, when power is not applied to the light route control member as shown in FIG. 20, the receiving part functions as the light blocking part, so that the display device is driven in a light blocking mode, and when power is applied to the light route control member as shown in FIG. 21, the receiving part functions as the light transmitting part, so that the display device may be driven in an open mode.

Accordingly, a user may easily drive the display device in a privacy mode or a normal mode according to application of power.

In addition, although not shown in the drawings, the display device to which the light route control member according to the embodiment is applied may also be applied inside the vehicle.

For example, the display device including the light route control member according to the embodiment may display a video confirming information of the vehicle and a movement route of the vehicle. The display device may be disposed between a driver seat and a passenger seat of the vehicle.

In addition, the light route control member according to the embodiment may be applied to a dashboard that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light route control member comprising:
a first substrate;
a first electrode disposed on an upper surface of the first substrate;
a second substrate disposed on the first substrate;
a second electrode disposed on a lower surface of the second substrate; and
a light conversion part disposed between the first electrode and the second electrode,
wherein the light conversion part includes a partition wall part and a receiving part that are alternately disposed,
wherein light transmittance of the receiving part is changed according to an application of voltage,
wherein the receiving part includes a dispersion and particles dispersed in the dispersion,
wherein the particles comprise a plurality of first particles and a plurality of second particles,
wherein the plurality of first particles and the plurality of second particles have different reflectances,
wherein the plurality of first particles and the plurality of second particles are disposed in the receiving part at different weight percentages with respect to a total number of particles,
wherein the plurality of first particles are light absorbing particles that absorb light, and the plurality of second particles are light scattering particles that reflect and scatter light,
wherein when no voltage is applied to the first electrode or the second electrode, the receiving part is driven as a light blocking part that blocks light through the receiving part, and the plurality of first particles and the plurality of second particles are dispersed within the receiving part,
wherein when voltage is applied to the first electrode or the second electrode, the receiving part is driven as a light transmitting part that allows light to be transmitted through the receiving part, and the plurality of first particles and the plurality of second particles move in a same direction within the receiving part, and
wherein when the receiving part is driven as the light transmitting part, the plurality of second particles reflect and scatter light to increase an amount of light passing through the receiving part.

2. The light route control member of claim 1, wherein the reflectance of the plurality of second particles is greater than reflectance of the plurality of first particles, and
wherein surfaces of the plurality of first particles and surfaces of the plurality of second particles are charged with a same polarity.

3. The light route control member of claim 2,
wherein the reflectance of the plurality of second particles is 50% to 90%.

4. The light route control member of claim 1, wherein the plurality of first particles includes a carbon black particle,
wherein the plurality of second particles includes a metal oxide particle.

5. The light route control member of claim 1, wherein the weight of the plurality of first particles is smaller than the weight of the plurality of second particles.

6. The light route control member of claim 5, wherein the plurality of first particles is included in an amount of 95% to 99% by weight with respect to the total number of particles, and
wherein the plurality of second particles is included in an amount of 1% to 5% by weight with respect to the total number particles.

7. The light route control member of claim 1, wherein a particle diameter of each of the plurality of first particles and the plurality of second particles is 500 nm to 700 nm.

8. A light route control member comprising:
a first substrate;
a first electrode disposed on an upper surface of the first substrate;
a second substrate disposed on the first substrate;
a second electrode disposed on a lower surface of the second substrate; and
a light conversion part disposed between the first electrode and the second electrode,
wherein the light conversion part includes a partition wall part and a receiving part that are alternately disposed,
wherein light transmittance of the receiving part is changed according to an application of voltage,
wherein the receiving part includes a dispersion and particles dispersed in the dispersion,
wherein the particles comprise a plurality of first particles and a plurality of second particles,
wherein reflectance of the plurality of second particles is greater than reflectance of the plurality of first particles,
wherein surfaces of the plurality of first particles and surfaces of the plurality of second particles are charged with a same polarity, and
wherein the plurality of first particles are light absorbing particles that absorb light, and the plurality of second particles are light scattering particles that reflect and scatter light,
wherein when no voltage is applied to the first electrode or the second electrode, the receiving part is driven as a light blocking part that blocks light through the receiving part, and the plurality of first particles and the plurality of second particles are dispersed within the receiving part,
wherein when voltage is applied to the first electrode or the second electrode, the receiving part is driven as a light transmitting part that allows light to be transmitted through the receiving part, and the plurality of first particles and the plurality of second particles move in a same direction within the receiving part, and
wherein when the receiving part is driven as the light transmitting part, the plurality of second particles reflect and scatter light to increase an amount of light passing through the receiving part.

9. The light route control member of claim 8,
wherein the reflectance of the plurality of second particles is 50% to 90%.

10. The light route control member of claim 8, wherein the first plurality of particles includes a carbon black particle,
wherein the plurality of second particles includes a metal oxide particle.

11. The light route control member of claim 10, wherein the metal oxide particle includes at least one of titanium dioxide ($TiO_2$), zirconium oxide ($ZrO_2$), indium oxide ($In_2O_3$), tin oxide ($SnO_2$), and aluminum oxide ($Al_2O_3$).

12. The light route control member of claim 8, wherein the plurality of first particles are included in an amount of 95% to 99% by weight with respect to the total number of particles, and
wherein the plurality of second particles are included in an amount of 1% to 5% by weight with respect to the total number of particles.

13. The light route control member of claim 8, wherein a particle diameter of each of the plurality of first particles and the plurality of second particles is 500 nm to 700 nm.

14. The light route control member of claim 8, wherein a specific gravity of the plurality of first particles is smaller than a specific gravity of the plurality of second particles.

15. A display device comprising;
a display panel; and
a light route control member disposed on the display panel,
wherein the light route control member comprises:
a first substrate;
a first electrode disposed on an upper surface of the first substrate;
a second substrate disposed on the first substrate;
a second electrode disposed on a lower surface of the second substrate; and
a light conversion part disposed between the first electrode and the second electrode,
wherein the light conversion part includes a partition wall part and a receiving part that are alternately disposed,
wherein light transmittance of the receiving part is changed according to an application of voltage,
wherein the receiving part includes a dispersion and particles dispersed in the dispersion,
wherein the particles comprise a plurality of first particles and a plurality of second particles,
wherein reflectance of the plurality of second particles is greater than reflectance of the plurality of first particles,
wherein surfaces of the plurality of first particles and surfaces of the plurality of second particles are charged with a same polarity,
wherein the plurality of first particles are light absorbing particles that absorb light, and the plurality of second particles are light scattering particles that reflect and scatter light,
wherein when no voltage is applied to the first electrode or the second electrode, the receiving part is driven as a light blocking part that blocks light through the receiving part, and the plurality of first particles and the plurality of second particles are dispersed within the receiving part,
wherein when voltage is applied to the first electrode or the second electrode, the receiving part is driven as a light transmitting part that allows light to be transmitted through the receiving part, and the plurality of first particles and the plurality of second particles move in a same direction within the receiving part, and
wherein when the receiving part is driven as the light transmitting part, the plurality of second particles reflect and scatter light to increase an amount of light passing through the receiving part.

16. The display device of claim 15,
wherein the reflectance of the plurality of second particles is 50% to 90%.

17. The display device of claim 15, wherein the plurality of plurality of first particles are included in an amount of 95% to 99% by weight with respect to the total number of particles, and
wherein the plurality of second particles are included in an amount of 1% to 5% by weight with respect to the total number of particles.

* * * * *